US00RE50773E

(19) United States
(12) Reissued Patent
Kim et al.

(10) Patent Number: US RE50,773 E
(45) Date of Reissued Patent: *Jan. 27, 2026

(54) APPARATUS AND METHOD FOR RANDOM ACCESS IN CELLULAR SYSTEM

(71) Applicant: Electronics and Telecommunications Research Institute, Daejeon (KR)

(72) Inventors: Jae Heung Kim, Daejeon (KR); Kyoung Seok Lee, Daejeon (KR); Jung-Im Kim, Daejeon (KR); Byung-Han Ryu, Daejeon (KR); Seung Chan Bang, Daejeon (KR)

(73) Assignee: Electronics and Telecommunications Research Institute, Daejeon (KR)

( * ) Notice: This patent is subject to a terminal disclaimer.

(21) Appl. No.: 17/681,778

(22) Filed: Feb. 27, 2022

Related U.S. Patent Documents

Reissue of:
(64) Patent No.: 8,797,973
Issued: Aug. 5, 2014
Appl. No.: 12/864,389
PCT Filed: Dec. 31, 2008
PCT No.: PCT/KR2008/007822
§ 371 (c)(1),
(2) Date: Jul. 23, 2010
PCT Pub. No.: WO2009/093816
PCT Pub. Date: Jul. 30, 2009

U.S. Applications:
(63) Continuation of application No. 15/229,082, filed on Aug. 4, 2016, now Pat. No. Re. 48,969, which is an application for the reissue of Pat. No. 8,797,973.

(30) Foreign Application Priority Data

Jan. 23, 2008 (KR) ..... 10-2008-0007134
Jun. 27, 2008 (KR) ..... 10-2008-0061646

(51) Int. Cl.
*H04W 74/00* (2009.01)
*H04W 48/06* (2009.01)
(Continued)

(52) U.S. Cl.
CPC ..... *H04W 74/002* (2013.01); *H04W 48/06* (2013.01); *H04W 48/16* (2013.01); *H04W 74/08* (2013.01); *H04W 84/042* (2013.01)

(58) Field of Classification Search
CPC ..... H04W 28/0284; H04W 74/002; H04W 74/0841; H04W 74/085; H04W 74/0858;
(Continued)

(56) References Cited

U.S. PATENT DOCUMENTS 7,768,965 B2 8/2010 Kwon et al.
7,843,877 B2 * 11/2010 Lee ..... H04L 47/10 370/329
(Continued)

FOREIGN PATENT DOCUMENTS

JP 2003-506931 2/2003
JP 2006-501769 1/2006
(Continued)

OTHER PUBLICATIONS

Non-final office action mailed Mar. 19, 2018 for U.S. Appl. No. 15/229,082.
(Continued)

*Primary Examiner* — Charles R Craver

(57) ABSTRACT

Disclosed is a method and apparatus for RA in a cellular system. The RA in the cellular system includes receiving an RA preamble from a terminal for RA, transmitting, to the terminal, an RA response message including a sequence of the received RA preamble and uplink resource information of the terminal and overload state information with respect to the RA, receiving control information generated based on the RA response message from the terminal through the uplink resource information, and transmitting control response information with respect to the received control information.

18 Claims, 6 Drawing Sheets

(51) Int. Cl.
*H04W 48/16* (2009.01)
*H04W 74/08* (2024.01)
*H04W 84/04* (2009.01)

(58) Field of Classification Search
CPC ..... H04W 74/0866; H04W 74/0833; H04W 84/042; H04W 48/16; H04W 48/06; H04W 74/08
See application file for complete search history.

(56) References Cited

U.S. PATENT DOCUMENTS

| | | | | |
|---|---|---|---|---|
| 8,295,255 | B2 | 10/2012 | Nakano | |
| 8,965,659 | B2 | 2/2015 | Kaap et al. | |
| 2007/0064665 | A1* | 3/2007 | Zhang et al. | 370/343 |
| 2007/0147310 | A1 | 6/2007 | Cai | |
| 2007/0206531 | A1 | 9/2007 | Pajukoski et al. | |
| 2008/0153532 | A1* | 6/2008 | Camp | 455/522 |
| 2009/0196239 | A1* | 8/2009 | Lee et al. | 370/329 |

FOREIGN PATENT DOCUMENTS

| | | | |
|---|---|---|---|
| JP | 2006-67115 | | 3/2006 |
| WO | 2007/001222 | A1 | 1/2007 |
| WO | 2007/024791 | A2 | 3/2007 |
| WO | 2007/024791 | A3 | 3/2007 |
| WO | 2007/078165 | A1 | 7/2007 |
| WO | 2007/083230 | A2 | 7/2007 |
| WO | 2007/091810 | A1 | 8/2007 |
| WO | 2007/091831 | A2 | 8/2007 |
| WO | 2007/091831 | A3 | 8/2007 |

OTHER PUBLICATIONS

Non-final office action mailed Oct. 28, 2020 for U.S. Appl. No. 15/229,082.
Final office action mailed Jul. 3, 2019 for U.S. Appl. No. 15/229,082.
Final office action mailed May 20, 2020 for U.S. Appl. No. 15/229,082.
Notice of Allowance mailed Nov. 12, 2021 for U.S. Appl. No. 15/229,082.
Non-final office action mailed May 14, 2013 for U.S. Appl. No. 12/864,389.
Final office action mailed Sep. 24, 2013 for U.S. Appl. No. 12/864,389.
Notice of Allowance mailed Mar. 24, 2014 for U.S. Appl. No. 12/864,389.

* cited by examiner

APPARATUS AND METHOD FOR RANDOM ACCESS IN CELLULAR SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

[This application] *More than one application has been filed for the reissue of U.S. Pat. No. 8,797,973 as application Ser. No. 15/229,082, filed Aug. 4, 2016 (issued as RE48,969 on Mar. 8, 2022), and the present continuation reissue application, application Ser. No. 17/681,778, filed on Feb. 27, 2022, which is a continuation reissue application of U.S. Pat. No. 8,797,973 (issued on Aug. 5, 2014), which issued from U.S. patent application Ser. No. 12/864,389, filed on Jul. 23, 2010, which* is a 35 U.S.C. §371 national stage filing of PCT Application No. PCT/KR2008/007822 filed on Dec. 31, 2008, which claims priority to, and the benefit of, Korean Patent Application No. 10-2008-0007134 filed on Jan. 23, 2008 and Korean Patent Application No. 10-2008-0061646 filed on Jun. 27, 2008. The contents of the aforementioned applications are hereby incorporated by reference.

TECHNICAL FIELD

The present invention relates to a method and apparatus for Random Access (RA) in a cellular system, and particularly, to a method and apparatus for RA using RA response message including common information.

BACKGROUND ART

In a cellular system for packet service, a plurality of terminals share radio resources unlike a circuit system where resources are allocated only to one terminal.

Accordingly, notification of the fact that radio resources are allocated to each terminal in the cellular system is required to be performed through AC response information so that each terminal can discriminate and access to the radio resources. In this instance, the cellular system is required to possess and transmit using minimal radio resources, thereby maximizing application of limited radio resources, when transmitting RA response information. Also, the RA response information is required to have a format for improving operational efficiency of a terminal that receives the RA response information.

DISCLOSURE OF INVENTION

Technical Problem

An aspect of the present invention provides a method and apparatus for Random Access (RA) which can improve operational efficiency of a terminal using an RA response message in byte alignment in a cellular system.

Another aspect of the present invention also provides a method and apparatus for RA which can efficiently use radio resources using existing RA preamble index in the cellular system.

Technical Solution

According to an aspect of the present invention, there is provided a method for Random Access (RA) in a cellular system, the method including: receiving an RA preamble from a terminal for RA, transmitting, to the terminal, an RA response message including a sequence of the received RA preamble and uplink resource information of the terminal and overload state information with respect to the RA, receiving control information, generated based on the RA response message, from the terminal through the uplink resource information, and transmitting control response information with respect to the received control information.

According to another aspect of the present invention, there is provided a terminal in a cellular system, including: a preamble transmitter to randomly select one of sequences preset by a base station, and to transmit an RA preamble, an RA response message processor to receive an RA response message including the RA preamble sequence and overload state information with respect to the RA from the base station, and to extract response information corresponding to the RA preamble sequence from the received RA response message, and a control information transmitter to generate radio resource control information based on the extracted response information, and to transmit the radio resource control information.

According to another aspect of the present invention, there is provided a base station in a cellular system, including: a preamble response information generator to receive RA preamble from a terminal, and to generate a response corresponding to the RA preamble, an RA response message generator to generate an RA response message including overload state information with respect to RA, sequence of the received RA preamble, and the generated response information, and a control response transmitter to receive radio resource control information generated based on the RA response message, and to transmit control response information with respect to the radio resource control information.

MODE FOR THE INVENTION

Figure 1:
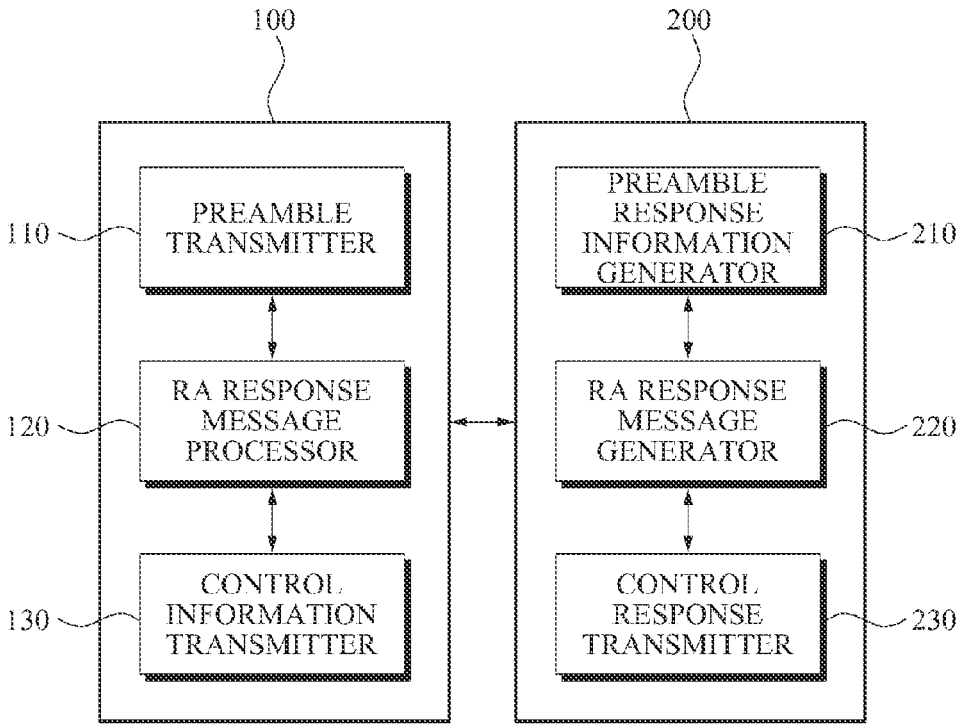
FIG. 1 is a block diagram illustrating a configuration of a cellular system according to example embodiments of the present invention.

Although a few exemplary embodiments of the present invention have been shown and described, the present invention is not limited to the described exemplary embodiments, wherein like reference numerals refer to the like elements throughout.

Hereinafter, a method and apparatus for efficiently constituting a Random Access (RA) response message in a cellular system according to example embodiments of the present invention will be described in detail referring to attached drawings.

A plurality of terminals share radio resources in the cellular system unlike a circuit system where resources are allocated only to one terminal.

Accordingly, it is required to be notified through an AC response information that radio resources are allocated to each terminal in the cellular system so that each terminal can discriminate and access to the radio resource.

In this instance, the RA procedure in the cellular system may be classified into a contention scheme and a non-contention scheme.

The RA procedure of the contention scheme is a RA procedure performed by a terminal to which a Cell Radio Network Temporary Identifier (C-RNTI) is not yet allocated from a base station or by a terminal to which a RA preamble sequence for the RA procedure is not allocated even though the C-RNTI is already allocated.

Conversely, the RA procedure of the non-contention scheme is a RA procedure that a base station allocates an RA preamble sequence which a terminal initially transmits in order for the RA procedure, and thereby can avoid competition which may occur in the RA procedure. The non-contention scheme may be targeted for a terminal in a handover or a terminal that is required to restart downlink data transmission.

FIG. 1 is a block diagram illustrating a configuration of a cellular system according to example embodiments of the present invention.

Referring to FIG. 1, the cellular system includes a terminal 100 and a base station 200.

The terminal 100 may include a preamble transmitter 110, RA response message processor 120, and control information transmitter 130.

The preamble transmitter 110 randomly select one of sequences preset by the base station 200 and transmit an RA preamble.

The RA response message processor 120 may receive an RA response message from the base station 200 and process the same.

Here, the RA response message may be in byte alignment and include common information, a detecting preamble index indicator, and response information.

The common information may include RA overload state information.

The detecting preamble index indicator may include RA preamble indexes of a plurality of terminals that attempt RA and also include response information corresponding to each of the RA preamble indexes.

Specifically, the response information may include uplink transmission timing alignment information, uplink transmission power correction information, uplink radio resource allocation information, temporarily allocated terminal identifier, and the like.

The RA response message processor 120 may verify whether an RA preamble sequence transmitted from the transmitter 110 is identical to an RA preamble index of the detecting preamble index indicator. In this instance, the RA response message processor 120 verify with respect to all of the plurality of RA preamble indexes included in the detecting preamble index indicator. When the identical RA preamble index exists, the RA response message processor 120 may extract response information corresponding to the RA preamble index.

The control information transmitter 130 may transmit control information including Radio Resource Control (RRC) connection and the like using the response information extracted from the response message processor 120. That is, the control information transmitter 130 may transmit control information formed by a power and modulation method corresponding to the response information through uplink resource information.

The base station 200 includes a preamble response information generator 210, RA response message generator 220, and control response transmitter 230.

The preamble response information generator 210 may receive an RA preamble from the terminal 100 and generate response information corresponding to the received RA preamble. That is, the preamble response information generator 210 may temporarily allocate a terminal identifier to discriminate a terminal that attempts RA and align uplink transmission time of the terminal 100. The preamble response information generator 210 may determine power with respect to information that the terminal may transmit later based on power information of the RA preamble. Also, the preamble response information generator 210 may allocate uplink information through which the terminal may transmit control information. Finally, the preamble response information generator 210 may generate response information including a terminal identifier that is temporarily allocated to the terminal where the RA preamble is transmitted, uplink transmission time, and power and uplink information.

The RA response message generator 220 may generate an RA response message including common information, detecting preamble index indicator, and response information, and transmit the generated RA response through a single downlink. Specifically, the RA response message generator 220 may generate the common information including overload state information due to random access and receive RA preamble index and response information from the preamble response information generator 210, and thereby can form the RA response message. In this instance, the RA response message generator 220 may include every detecting preamble index indicator and response information corresponding to a plurality of terminals.

Figure 2:
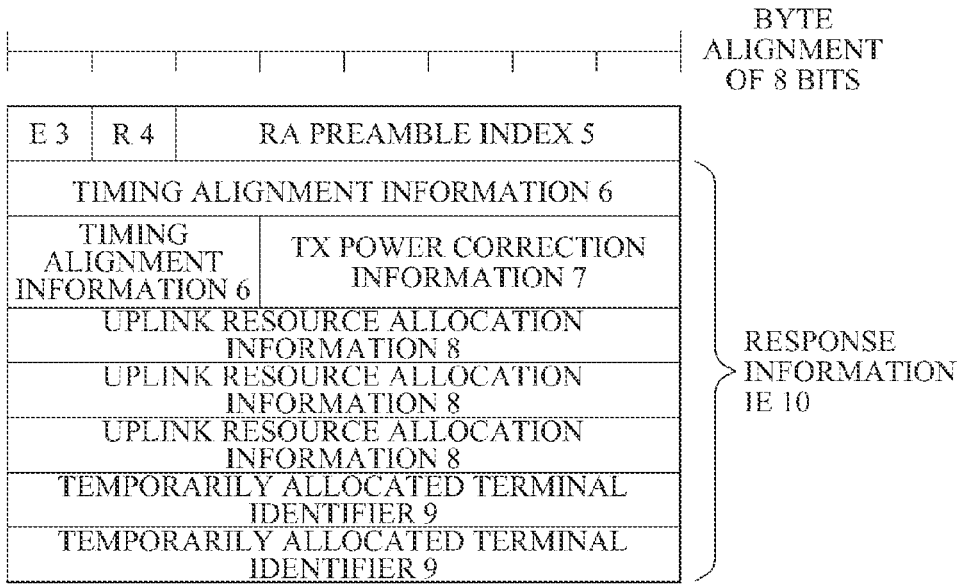
FIG. 2 is an example of a format of a basic response message which constitutes a Random Access (RA) response message according to example embodiments of the present invention.

FIG. 2 is an example of a format of a basic response message which constitutes an RA response message according to example embodiments of the present invention.

Referring to FIG. 2, the basic response message constituting the RA response message is in byte alignment, and thereby can improve operational efficiency of a terminal that receives a message.

The basic response message constituting the RA response message may include a preamble existence bit 3, RA preamble index 5, uplink transmission timing alignment information 6, uplink transmission power correction information 7, uplink radio resource allocation information 8, and temporarily allocated terminal identifier 9.

The RA preamble index 5 may be an index indicating an RA preamble sequence received from the terminal for the RA. The RA preamble index 5, for example, may be composed of six bits.

The preamble existence bit 3 indicates an RA preamble index for an additional terminal excluding the terminal to which the RA preamble index 5 is transmitted exists. For example, when the preamble existence bit 3 is set to one, it may indicate that there is the additional RA preamble index and when set to zero, it may indicate that there is no other RA preamble index.

The uplink transmission timing alignment information 6 is information for aligning uplink transmission time of the terminal to which the RA preamble index 5 is transmitted. The uplink transmission timing alignment information 6, for example, may be composed of eight to eleven bits.

The uplink transmission power correction information 7 indicates transmission power correction information of the terminal to which the RA preamble index 5 is transmitted. That is, the uplink transmission power correction information 7 indicates uplink transmission power correction information to be applied to a transmission timing of control information that the terminal may transmit subsequently, based on RA preamble reception power. The uplink transmission power alignment information 7, for example, may be composed of five to twenty four bits.

The uplink radio resource allocation information 8 indicates uplink radio resource information that enables the terminal that attempts RA to transmit control information to an uplink after receiving the RA response message. The uplink radio resource allocation information 8 may include radio resource allocation information including location information of a sub-carrier which the terminal is able to possess and modulation and encoding information to be applied when the terminal transmits data through allocated radio resources.

The temporarily allocated terminal identifier 9 indicates an identifier that is temporarily allocated for discrimination of the terminal that attempts the RA in order to perform scheduling in a base station. The temporarily allocated terminal identifier 9, for example, may be composed of sixteen bits.

Also, a reserved field 4 included in the detecting preamble index indicator 13 indicates a reserved bit. The reserved field 4 may be used as an information discrimination bit which indicates one byte information including the reserved field 4 is common information or uncommon information.

Figure 3:
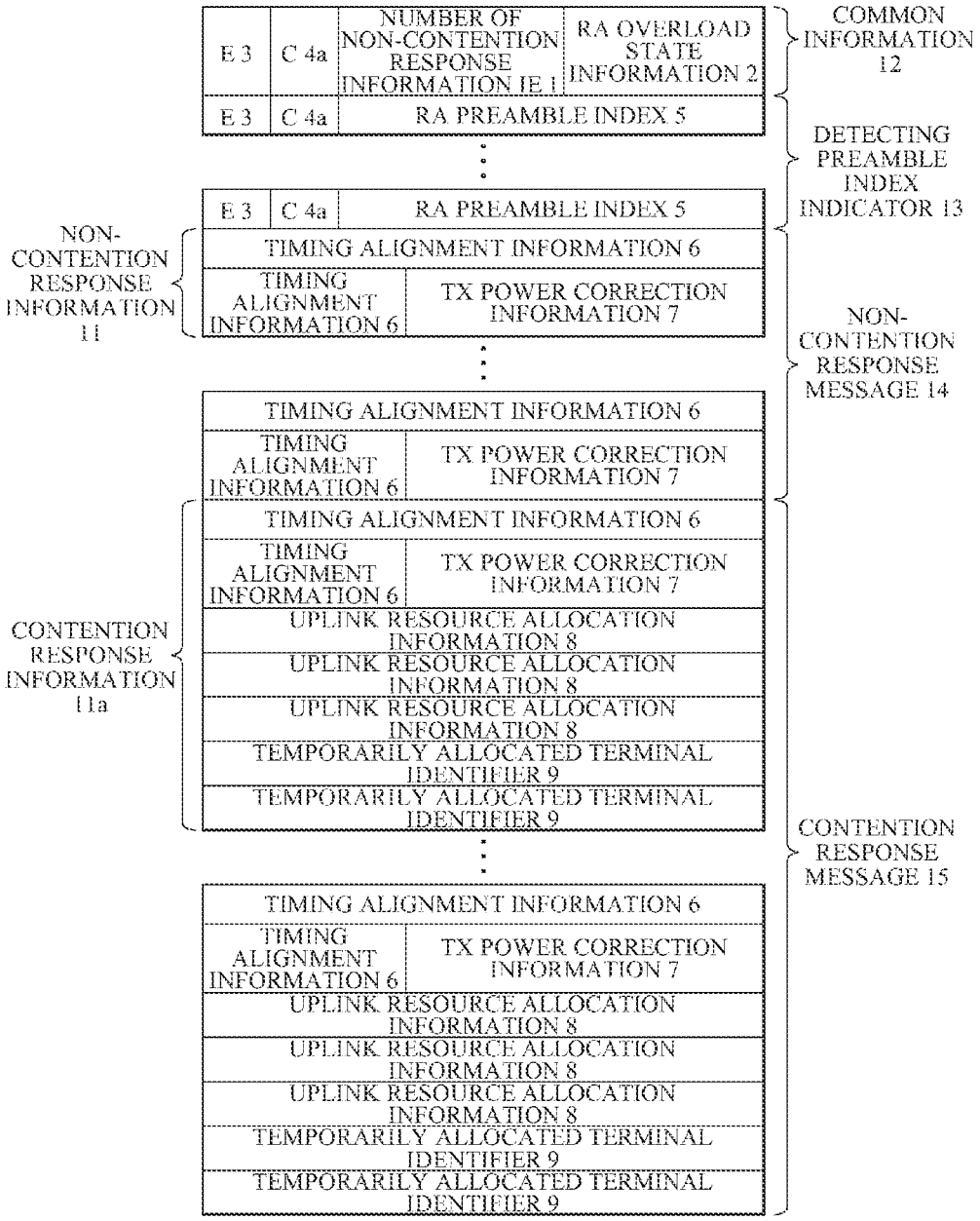
FIG. 3 illustrates a format of an RA response message according to a first example embodiment of the present invention.

FIG. 3 illustrates a format of an RA response message according to a first example embodiment of the present invention.

Referring to FIG. 3, the RA response message according to the first example embodiment of the present invention may include common information 12, detecting preamble index indicator 13, non-contention response message 14, and contention response message 15. The common information 12, detecting preamble index indicator 13, non-contention response message 14, and contention response message 15 included in the RA response message may be in byte alignment, and may be multiplexed to a single shared downlink channel and transmitted to a terminal.

The common information 12 may include a preamble existence bit 3, information distribution bit 4a, number of non-contention response information 1, and RA overload state 2. The common information 12 may be composed of one byte.

The preamble existence bit 3 indicates an RA preamble index 5 that is received from a terminal that attempts RA next to a common information.

Accordingly, the preamble existence bit 3 included in the common information 12 may indicate response messages 14 and 15 or the detecting preamble index indicator 13 which may exist next to the common information 12.

The information discrimination bit 4a may help discriminate whether the information including the information discrimination bit 4a is the common information 12 or RA information excluding the common information 12, namely, uncommon information.

For example, when the information discrimination bit 4a is set to one, the information of one byte including the information discrimination bit 4a may indicate the common information 12.

The number of non-contention response information 1, which indicates a number of non-contention response information 11, may enable the terminal to discriminate the non-contention response message 14 from the contention response message 15.

The RA overload state 2, which indicates an overload state by RA, may provide information to help the terminal to avoid a possibility of collision on random access. For example, the RA overload state 2 indicates information such as a back off process of the terminal or a number of RA attempts, selecting an RA preamble, and the like.

The detecting preamble index indicator 13 may include the RA preamble index 5, preamble existence bit 3, and information discrimination bit 4a.

The RA preamble index 5 may indicate an RA preamble sequence received from the terminal that attempts RA.

The preamble existence bit 3 may indicate an RA preamble index of another terminal that attempts RA.

The information discrimination bit 4a may help discriminate whether the information including the information discrimination bit 4a is the common information 12 or RA information excluding the common information 12, namely, uncommon information.

For example, when the information discrimination bit 4a is set to zero, the information of one byte including the information discrimination bit 4a may indicate the detecting preamble index indicator 13 of the uncommon information.

The detecting preamble index indicator 13 may include the RA preamble index 5, preamble existence bit 3, and information discrimination bit 4a corresponding to every terminal that attempts RA. Here, when the preamble existence bit 3 is set to zero, for example, it may indicate a last RA preamble index existing in the detecting preamble index indicator 13.

Also, the detecting preamble index indicator 13 may include the non-contention RA preamble index and contention RA preamble index. In this instance, the contention RA preamble index may exist next to the non-contention RA preamble index.

The contention response message 15 and non-contention response message 14 is setup information with respect to a control information message to be transmitted after the terminal receives the RA response message. The contention response message 15 is a message with respect to a terminal that attempts RA in a contention scheme and the non-contention response message 14 is a message with respect to a terminal that attempts RA in a non-contention scheme. In this instance, the contention response message 15 and the non-contention response message 14 may respectively include a plurality of contention response information 11a and non-contention response information 11. Also, the contention response information 11a of the contention response message 15 and the non-contention response information 11 of the non-contention response message 14 may be ordered corresponding to an order of the RA preamble index 5 of the detecting preamble index indicator 13.

The contention response information 11a included in the contention response message 15 may include uplink transmission timing alignment information 6, uplink transmission power correction information 7, uplink radio resource allocation information 8, and temporarily allocated terminal identifier 9.

The uplink transmission timing alignment information 6 indicates information to align the uplink transmission time of the terminal that transmits the RA preamble index 5. The uplink transmission power correction information 7 indicates transmission power correction information of the terminal that transmits the RA preamble index 5. The uplink radio resource allocation information 8 indicates uplink radio resource information that enables the terminal that attempts RA to transmit control information to an uplink after receiving the RA response message. The temporarily allocated terminal identifier 9 indicates an identifier that is temporarily allocated to the terminal for discriminating the terminal that attempts RA when scheduling is performed in the base station.

The non-contention response information 11 included in the non-contention response message 14 may include only the uplink transmission timing alignment information 6 and uplink transmission correction information 7 since it does not requires the temporarily allocated terminal identifier, unlike the contention response information 11a. In the RA response message, the non-contention response message may be located before the contention response message 15.

A boundary of the mentioned non-contention response information 11 and the contention response information 11a may be discriminated by the number of non-contention response information and preamble existence bit 3.

For instance, an RA preamble index corresponding to a value set to the number of non-contention response information 1 indicates a last non-contention RA preamble index. Also, when the preamble existence bit 3 of the last non-contention RA preamble index is set to one, a subsequent RA preamble index may be a contention RA preamble index. Accordingly, since the RA preamble index discriminates a non-contention index from contention index, a boundary of the non-contention response information and contention response information respectively corresponding to each RA preamble index may be discriminated.

The RA response message according to the first example embodiment is not limited to a drawing as shown in FIG. 3, and the common information 12 may be constituted only by the number of non-contention response information 1 and RA overload state information 2. Also, the detecting preamble index indicator 13 may include only the RA preamble index 5 and preamble existence bit 3.

However, the base station forms the RA response message including information discrimination bit 4a, and thus there is no need to fix the common information 12 to a specific location of the RA response message. Also, the base station may form the RA response message including the common information 12 selectively when required and transmit.

Also, the RA response message according to the first example embodiment of the present invention may introduce the number of non-contention response information 1 to discriminate the non-contention response information from contention response information, and thereby can use the non-contention response information of a small size. Finally, as the format of the message is minimized, application of the radio resources is improved.

Figure 4:
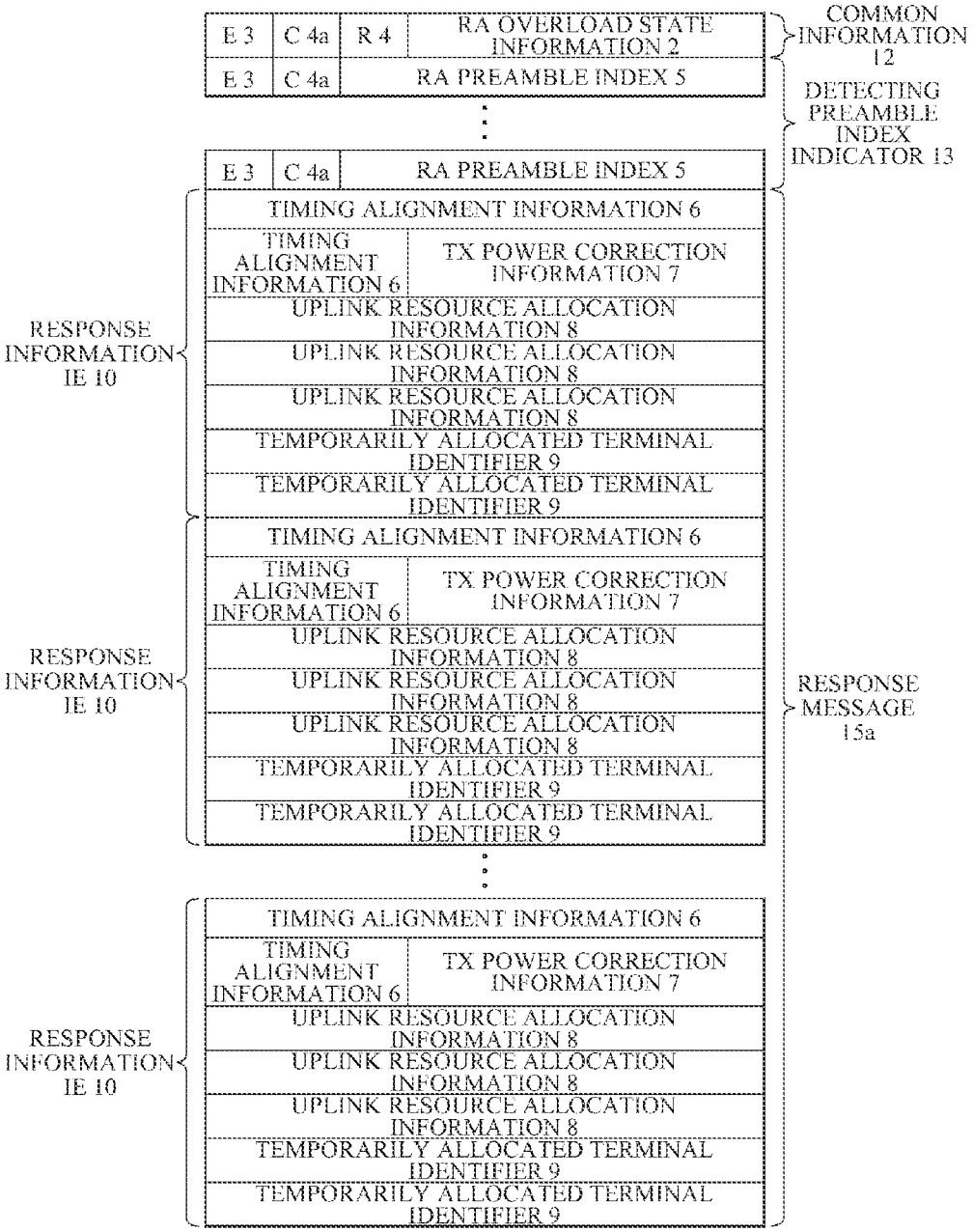
FIG. 4 illustrates a format of an RA response message according to a second example embodiment of the present invention.

FIG. 4 illustrates a format of an RA response message according to a second example embodiment of the present invention.

Referring to FIG. 4, since the format of the RA response message according to the second example embodiment is identical with the format of RA response message illustrated with reference to FIG. 3, description thereof will be omitted.

However, common information 12 include a preamble existence bit 3, information discrimination bit 4a, reserved field 4, and RA overload state information 2, and may be composed of one byte.

Also, a response message 15a may include uplink transmission timing alignment information 6, uplink transmission power correction information 7, uplink radio resource allocation information 8, and temporarily allocated terminal identifier 9 with respect to a terminal that attempts RA without discrimination of a non-contention response message or contention response message.

Figure 5:
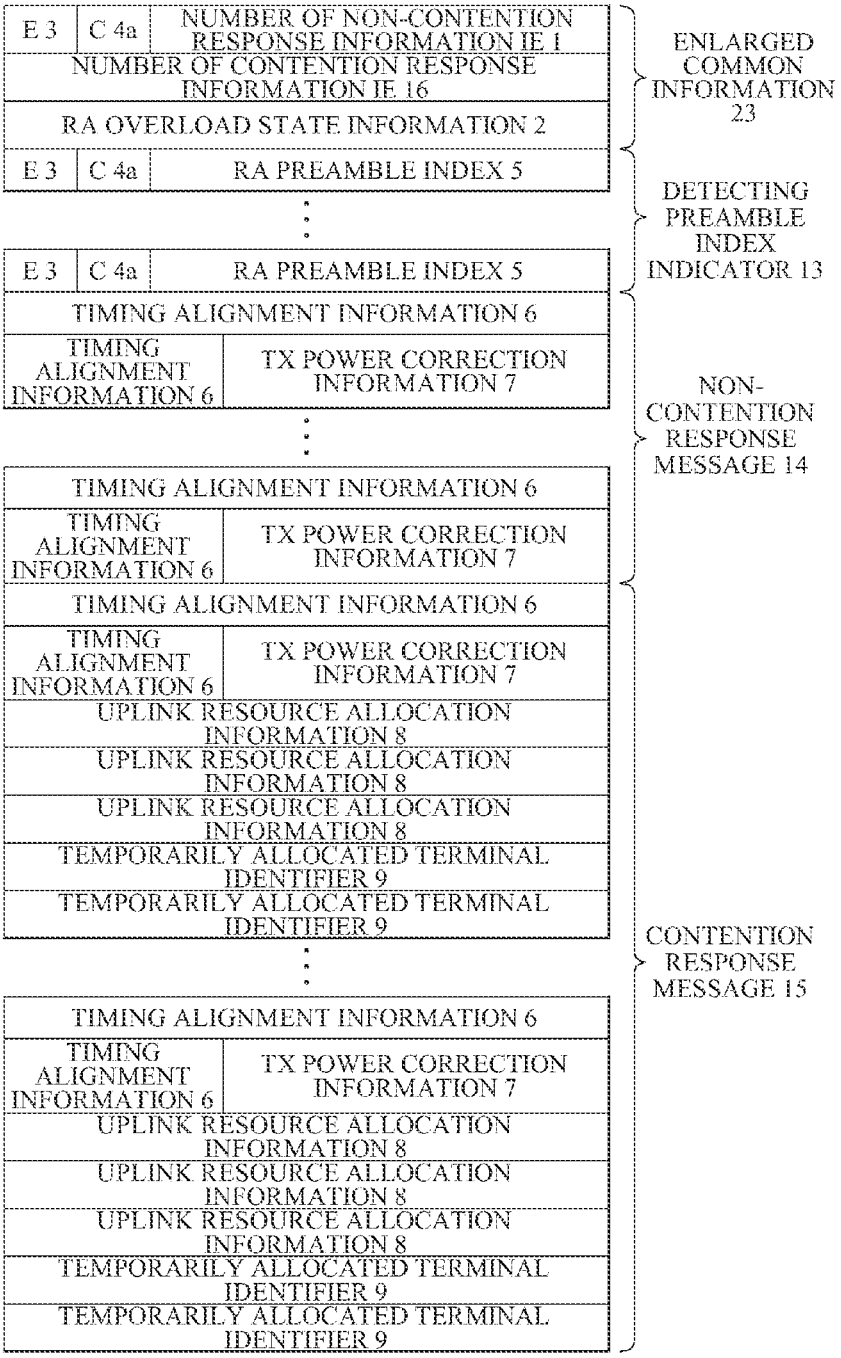
FIG. 5 illustrates a format of an RA response message according to a third example embodiment of the present invention.

FIG. 5 illustrates a format of an RA response message according to a third example embodiment of the present invention.

Referring to FIG. 5, since the format of the RA response message according to the third example embodiment is identical with the format of RA response message illustrated with reference to FIG. 3, description thereof will be omitted.

However, common information 12 includes a preamble existence bit 3, information discrimination bit 4a, number of non-contention response information 1, number of contention response information 16, and RA overload state information 2.

In this instance, the common information 12, for instance, may include preamble existence bit 3 of one byte, information discrimination bit 4a, number of non-contention response information 16 and RA overload state information 2 of one byte, and may be composed of three bytes.

Also, although not illustrated in FIG. 5, when the common information is constituted by only the number of non-contention response information, the number of contention response information, and RA overload state information, a detecting preamble index indicator may be constituted by an RA preamble index.

That is, the detecting preamble index indicator may not include the preamble existence bit and information discrimination bit, and may be constituted including a reserved field of two bytes, thereby having an advantage of flexibility with respect to applications of bits.

Figure 6:
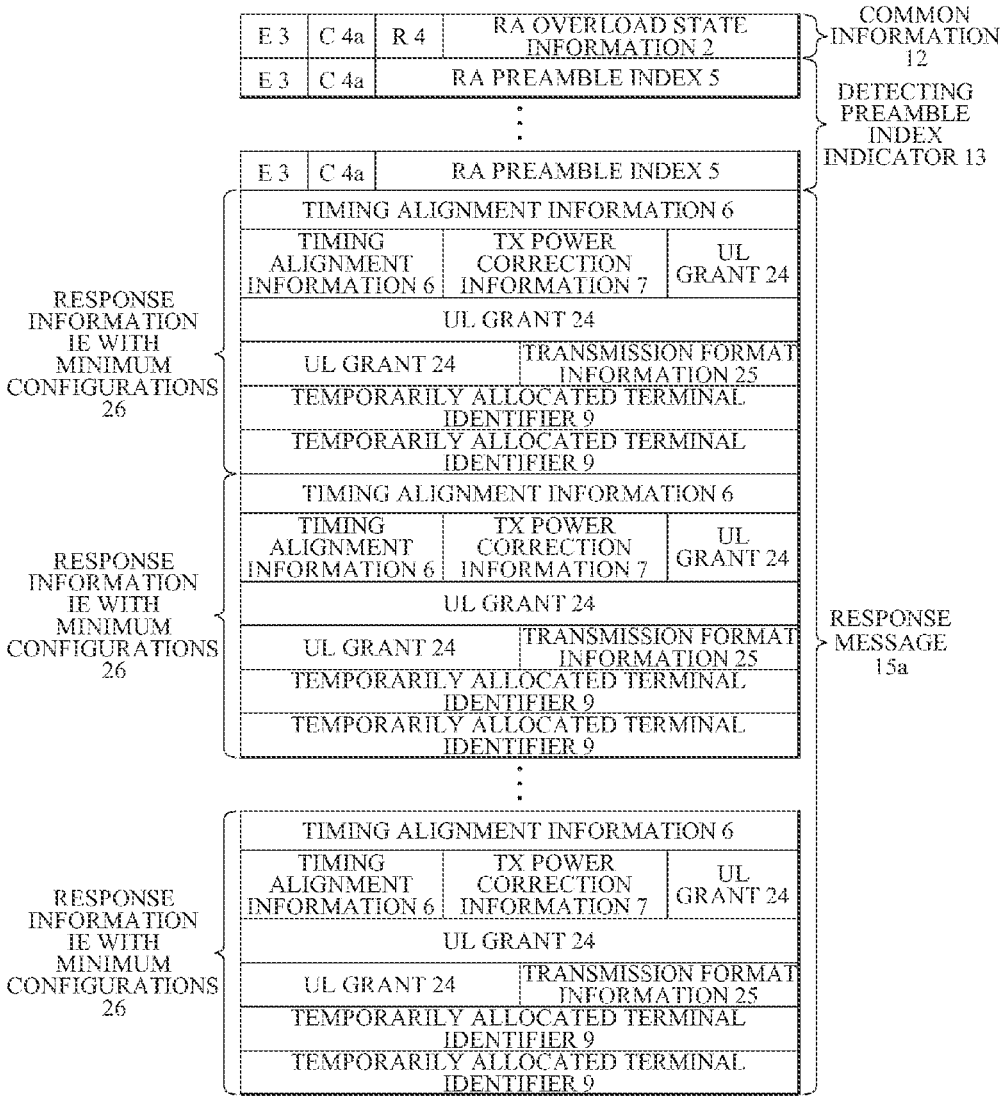
FIG. 6 illustrates a format of an RA response message according to a fourth example embodiment of the present invention.

FIG. 6 illustrates a format of an RA response message according to a fourth example embodiment of the present invention.

Referring to FIG. 6, since the format of the RA response message according to the fourth example embodiment is identical with the format of RA response message illustrated with reference to FIG. 4, description thereof will be omitted.

However, a number of bits of transmission power correction information 7 decreases in response information 26 and uplink resource allocation information 8 is organized into radio resource location information of UL Grant 24 indicating a sub-carrier index of an allocated uplink and transmission format information 25. Here, the uplink transmission power correction information 7 and transmission format information 25 may be set to a minimum number of bits by introducing a special range, namely power correcting level range, and a modulation and encoding level for RA response information.

Accordingly, an order of the uplink transmission power correction information 7, UL Grant 24, and transmission format information 25 may be arranged, and thus a minimum number of bits being processed to extract each field in the RA response information is possible.

Therefore, the response information is constituted by minimum resources unlike that illustrated in FIG. 3, thereby maximizing utilization of radio resources.

Figure 7:
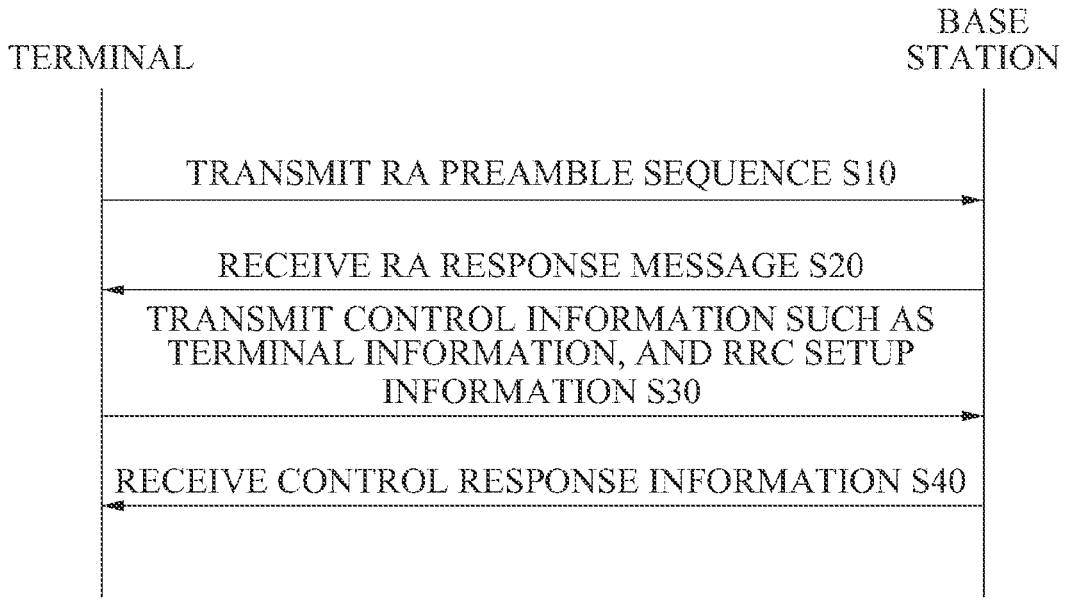
FIG. 7 illustrates an RA procedure of the cellular system according to example embodiments of the present invention.

FIG. 7 illustrates an RA procedure of the cellular system according to the present invention.

Referring to FIG. 7, first, a base station receives an RA preamble from a terminal for RA in operation S10.

Subsequently, the base station transmits an RA response message to the terminal in operation S20.

The base station transmits the RA response message including an RA preamble sequence, uplink resource information of the terminal, and overload state information with respect to the RA to the terminal. The RA response message may further include a number of non-contention response information, number of contention response information, and preamble existence bit indicating that an RA preamble corresponding to an additional terminal excluding the terminal exists.

Subsequently, the base station receives control information in operation S30.

The base station receives the control information generated based on the RA response message from the terminal.

Here, the base station receives a control information message such as a radio resource control connection formed by power and a modulation scheme corresponding to the response information of the RA response message and the like through uplink resource information of the response information at the time of uplink transmission.

Next, the base station transmits the control response information in operation S30.

A method for RA in a cellular system according to the present invention may be recorded computer-readable media including program instructions to implement various operations embodied by a computer. The media may also include, alone or in combination with the program instructions, data files, data structures, and the like. The program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

A method and apparatus for RA according to example embodiments of the present invention use an RA response message in byte alignment, thereby improving operational efficiency of a terminal. Also, the method and apparatus use information about existence of an RA preamble index, and thereby can use radio resources efficiently.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

[1. A method for Random Access (RA) in a communication system, the method comprising:

receiving RA preambles from a plurality of terminals; and transmitting an RA response message to the plurality of terminals, wherein the RA response message includes:

common information for the plurality of terminals wherein the common information comprises overload condition information with respect to the RA of the plurality of terminals;

a plurality of RA preamble indicators respectively indicating each RA preamble from each terminal; and a plurality of RA responses respectively corresponding to each terminal, wherein the common information including the overload condition information in the RA response message is distinct from the plurality of RA preamble indicators and the plurality of RA responses, and the RA response message further includes an information discrimination field indicating that the overload condition information is included;

wherein the overload condition information includes a back off time information for the plurality of the terminals.]

[2. The method of claim 1, wherein each RA response comprises uplink timing information, uplink allocation information, and temporary terminal identifier.]

[3. The method of claim 2, wherein the uplink allocation information indicates uplink resource to be used on the uplink transmission and further indicates modulation and coding scheme for the uplink resource.]

[4. The method of claim 1, wherein the RA response message includes:

the common information comprising the overload condition information;

first RA preamble indicator corresponding to a first terminal among the terminals;

second RA preamble indicator corresponding to a second terminal among the terminals;

first RA response corresponding to the first terminal; and second RA response corresponding to the second terminal.]

[5. The method of claim 4, wherein the first RA response comprises first uplink timing information, first uplink allocation information, and first temporary terminal identifier corresponding to the first terminal and the second RA response comprises second uplink timing information, second uplink allocation information, and second temporary terminal identifier corresponding to the second terminal.]

[6. The method of claim 1, wherein the RA response message further includes preamble existence field indicating if additional RA preamble indicator exists or not.]

[7. A method for Random Access (RA) of a first terminal in a communication system, the method comprising:

transmitting an RA preamble to a base station; and receiving an RA response message from the base station, wherein the RA response message includes: common information for the first terminal and second terminals attempting RA to the base station wherein the common information comprises overload condition information with respect to the RA of the first terminal and the second terminals;

first RA preamble indicator corresponding to the first terminal; a plurality of RA preamble indicators respectively corresponding to the second terminals;

first RA response corresponding to the first terminal; and a plurality of RA responses respectively corresponding to the second terminals, wherein the common information including the overload condition information in the RA response message is distinct from the plurality of RA preamble indicators and the plurality of RA responses, and the RA response message further includes an information discrimination field indicating that the overload condition information is included;

wherein the overload condition information includes a back off time information for the first terminal and the second terminals.]

[8. The method of claim 7, wherein the first RA response comprises uplink timing information, uplink allocation information, and temporary terminal identifier for the first terminal.]

[9. The method of claim 8, wherein the uplink allocation information indicates uplink resource to be used on the uplink transmission and further indicates modulation and coding scheme for the uplink resource.]

*10. A communication method, the method comprising:*

*transmitting, at a first terminal, a Random Access (RA) preamble to a base station; and*

*receiving, at the first terminal, an RA response message from the base station,*

*wherein the RA response message includes:*

*common information for the first terminal and second terminals, wherein the common information comprises overload condition information;*

*a plurality of RA preamble indicators;*

*and a plurality of RA responses,*

*wherein the common information comprising the overload condition information in the RA response message is distinct from the plurality of RA preamble indicators and the plurality of RA responses, and the RA response message includes a first field indicating that the overload condition information is included, and*

*wherein the overload condition information comprises back off time information.*

*11. The method of claim 10, wherein each of the plurality of RA responses comprises uplink timing information and uplink allocation information.*

*12. The method of claim 11, wherein the uplink allocation information indicates uplink resource to be used on uplink transmission and further indicates modulation and coding scheme for the uplink resource.*

*13. The method of claim 10, wherein each of the plurality of RA responses identifies one of the first terminal and the second terminals.*

*14. The method of claim 10, wherein one of the plurality of RA responses comprises a temporary terminal identifier of the first terminal.*

*15. The method of claim 10, wherein each of the plurality of RA responses comprises a temporary terminal identifier of one of the first terminal and the second terminals.*

*16. A terminal, comprising:*

*a memory; and*

*a processor, operably coupled to the memory,*

*wherein the processor, when executing program instructions stored in the memory, is configured to:*

*cause the terminal to transmit a Random Access (RA) preamble to a base station; and*

*cause the terminal to receive an RA response message from the base station, wherein the RA response message includes:*

*common information for the terminal and other terminals, wherein the common information comprises overload condition information;*

*a plurality of RA preamble indicators;*

*and a plurality of RA responses,*

*wherein the common information comprising the overload condition information in the RA response message is distinct from the plurality of RA preamble indicators and the plurality of RA responses, and the RA response message includes a first field indicating that the overload condition information is included, and*

*wherein the overload condition information comprises back off time information.*

*17. The terminal of claim 16, wherein each of the plurality of RA responses comprises uplink timing information and uplink allocation information.*

*18. The terminal of claim 17, wherein the uplink allocation information indicates uplink resource to be used on uplink transmission and further indicates modulation and coding scheme for the uplink resource.*

*19. The terminal of claim 16, wherein each of the plurality of RA responses identifies one of the terminal and the other terminals.*

*20. The terminal of claim 16, wherein one of the plurality of RA responses comprises a temporary terminal identifier of the terminal.*

*21. The terminal of claim 16, wherein each of the plurality of RA responses comprises a temporary terminal identifier of one of the terminal and the other terminals.*

*22. A communication device for a terminal, the communication device comprising:*

*a memory; and*

*a processor, operably coupled to the memory,*

*wherein the processor, when executing program instructions stored in the memory, is configured to:*

*cause the terminal to transmit a Random Access (RA) preamble to a base station; and*

*cause the terminal to receive an RA response message from the base station, wherein the RA response message includes:*

*common information for the terminal and other terminals, wherein the common information comprises overload condition information;*

*a plurality of RA preamble indicators;*

*and a plurality of RA responses,*

*wherein the common information comprising the overload condition information in the RA response message is distinct from the plurality of RA preamble indicators and the plurality of RA responses, and the RA response message includes a first field indicating that the overload condition information is included, and*

*wherein the overload condition information comprises back off time information.*

*23. The communication device of claim 22, wherein each of the plurality of RA responses comprises uplink timing information and uplink allocation information.*

*24. The communication device of claim 23, wherein the uplink allocation information indicates uplink resource to be used on uplink transmission and further indicates modulation and coding scheme for the uplink resource.*

*25. The communication device of claim 22, wherein each of the plurality of RA responses identifies one of the terminal and the other terminals.*

*26. The communication device of claim 22, wherein one of the plurality of RA responses comprises a temporary terminal identifier of the terminal.*

*27. The communication device of claim 22, wherein each of the plurality of RA responses comprises a temporary terminal identifier of one of the terminal and the other terminals.*

* * * * *